June 27, 1939. C. H. GIBBONS 2,163,873
APPARATUS FOR DETERMINING RATE OF STRAIN
Filed Aug. 31, 1936  3 Sheets-Sheet 2

INVENTOR
C. H. Gibbons
BY
ATTORNEY

June 27, 1939. C. H. GIBBONS 2,163,873
APPARATUS FOR DETERMINING RATE OF STRAIN
Filed Aug. 31, 1936 3 Sheets-Sheet 3

INVENTOR
C. H. Gibbons
BY
ATTORNEY

Patented June 27, 1939

2,163,873

UNITED STATES PATENT OFFICE 2,163,873

APPARATUS FOR DETERMINING RATE OF STRAIN

Chester H. Gibbons, Drexel Hill, Pa., assignor to Baldwin-Southwark Corporation, a corporation of Delaware Application August 31, 1936, Serial No. 98,701

7 Claims. (Cl. 265—12)

This invention relates generally to materials testing apparatus and more particularly to improved means for determining the rate of strain of a specimen.

It is an object of my invention to provide improved and simplified means for determining the rate of strain of a specimen. A further object is to provide improved means for visually indicating with a high degree of accuracy when the rate of strain of a specimen varies from a predetermined value. Another object is to provide improved means adapted to be readily adjusted for different rates of strain.

Other objects have to do with providing a rate of strain apparatus that is simple and economical in manufacture and maintenance and is operable with ease and efficiency together with a high degree of sensitivity notwithstanding the sturdy and durable structural characteristics inherent in my improved combination.

Other objects and advantages will be more apparent to those skilled in the art from the following description of the accompanying drawings in which:

Fig. 4 is a section on line 4—4 of Fig. 2;

Fig. 4a is a bottom plan of the photo cell;

Figure 1:
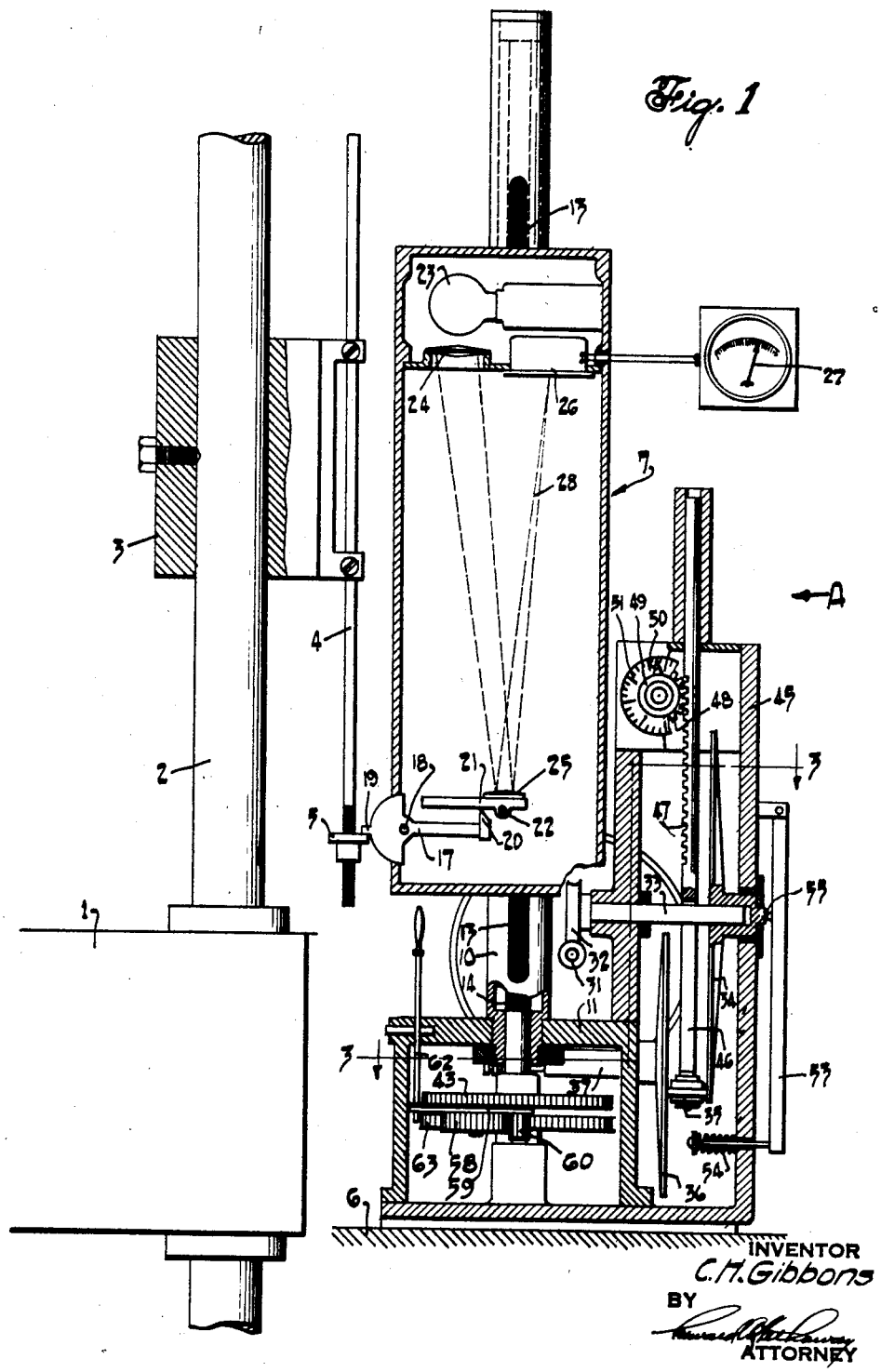
Fig. 1 is a front elevation of my improved rate of strain apparatus partly broken away to show details of construction, and also shown as applied to a testing machine only a portion of which is disclosed for purposes of simplicity.

In the particular embodiments of the invention which are disclosed herein merely for the purpose of illustrating certain specific forms among possible others that the invention might take in practice, I have diagrammatically shown in Fig. 1 a testing machine having a movable load platen 1 supported upon vertical load columns 2 for loading a compression or tension specimen in a manner well understood in the art. My improved apparatus is of course applicable to either hydraulic or mechanical types of testing machines, but for purposes of specific reference to a testing machine attention is directed to Emery Patent No. 1,848,468. The rate of movement of column 2 will be substantially the rate of strain of the specimen.

To load the specimen so that it will have a predetermined rate of strain, I have provided a collar 3 adjustably rigidly secured to column 2 while a rod 4 vertically adjustable in collar 3 carries a follower collar 5 specifically shown as a flanged nut adjustably threaded on rod 4. Mounted on a suitable stationary base 6 or other member located adjacent the testing machine is a carriage or equivalent mechanism generally indicated at 7, this carriage being moved vertically at a predetermined rate of speed in a manner to be described. The form of this carriage as shown in Fig. 1 comprises a box having a sleeve 8 secured to the back side 9 of the box. This sleeve is slidably supported upon a vertical sleeve 10 whose lower end extends through and is rigidly secured to a horizontal wall 11 of a housing for the driving mechanism to be described later. The sleeve 8 carries, Fig. 4, fragmentary radial nut portions 12, extending inwardly through slots 13 in tube 10, for threaded engagement with a screw 14 centrally located within sleeve 10. Hence by rotation of screw 14 at a predetermined rate of speed, it will be seen that carriage box 7 will move vertically along sleeve 10 at a corresponding rate of speed.

To utilize the foregoing predetermined rate of movement for the purpose of determining the rate of strain of a specimen, I have provided as shown in Fig. 1 a lever 17 suitably pivotally supported as at 18 in the box structure. The outer end of this arm is provided with a projection 19 adapted to rest upon the flange of nut 5 while the inner end of said arm is provided with a knife edge contact 20 which engages a mirror support 21. This mirror is pivotally supported as at 22 within the carriage case 7. A light source such as a small incandescent lamp 23 is located in the upper end of carriage 7 and focused through a suitable lens 24 upon the mirror 25, the reflected beam impinging upon any usual photoelectric cell 26 but whose bulb surface has a transparent V-opening 26', Fig. 4a, formed by making the remaining surface opaque by paint or other means. This cell may variably operate a suitable electrical indicating instrument diagrammatically indicated at 27 in accordance with the intensity of light impinging upon cell 26 as explained shortly.

From the foregoing disclosure it is seen that if the specimen is being loaded so that its rate of strain is identical to the rate of movement of carriage 7, then no relative movement will occur between arm 17 and nut 5 with the result that mirror 25 will remain in what might be termed its neutral or zero position. Hence the light beam 28 will cause photo-electric cell 26 to hold indicator 27 in its zero position, thus indicating that the specimen is being strained at the predetermined rate at which carriage 7 is being moved. The instant that the specimen is not being loaded at such a rate as to maintain the desired rate of strain, then the relative movement occurs between arm 17 and nut 5, thereby causing arm 17 to swing and consequently move support 21 and its mirror 25. Light beam 28 will thereupon move lengthwise of the V-opening toward or away from the apex of V-opening 26' so as to vary the intensity of light in cell 26 and accordingly cause a corresponding variation in the position of the indicator 27. If desired, cell 26 could be omitted and light beam 28 allowed to project upon the ceiling or a horizontal surface (which may be considered as represented by the under surface of member 26), said surface being some distance above the machine with suitable graduations on the ceiling or surface so as to indicate the zero position of the apparatus. Hence any variation in the rate of strain of the specimen from the predetermined value would immediately result in the beam 28 moving away from the zero graduation on the celing. Thereupon the operator of the machine would vary the load in whichever direction would be necessary to return the beam to its zero position.

Figure 2:
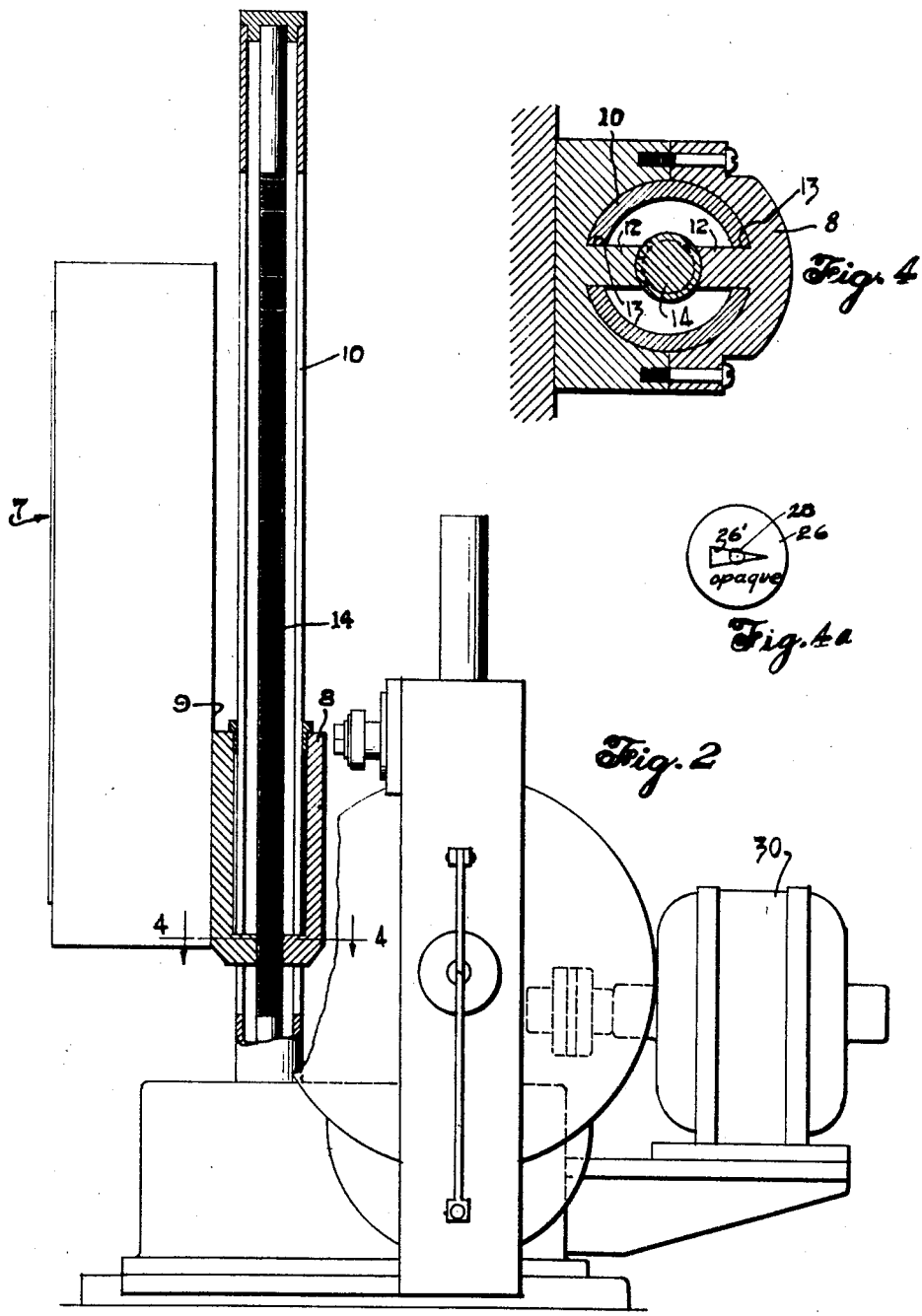
Fig. 2 is a side elevation of Fig. 1 viewed in the direction of arrow a thereof.

Various driving mechanisms could be provided for screw 14, but the specific apparatus here shown is particularly applicable to carrying out my desired results by reason of the simplicity, positiveness and adjustability of its power train. To this end, I provide a motor 30, Fig. 2, driving successively, Fig. 1, a worm 31, worm wheel 32, shaft 33, friction disc 34, radially adjustable friction wheel 35, friction disc 36, shaft 37, worm 38, Fig. 3, worm gear 39, shaft 40, gears 41 and 42 meshing with each other and a gear 43 meshing with gear 42 the gear 43 being secured to screw 14. All of the foregoing shafts, gears and elements are suitably journalled in the walls of a driving housing 45, Fig. 1, formed of any number or arrangement of parts desired.

To obtain any predetermined rate of speed of carriage 7, friction wheel 35 is journalled in the lower end of a rod 46 preferably slotted to extend around shaft 33, the uper end of said rod being provided with teeth 47 so as to be adjusted vertically by a pinion 48 journalled in the upper end of casing 45. The pinion shaft extends through the casing and is provided with any suitable finger grip 49 and a pointer 50 so as to indicate on suitable graduations 51, Fig. 1, the position of friction wheel 35. To maintain a predetermined degree of friction between the wheels, there is provided a lever 53 pivotally supported in its upper end on casing 45 and biased inwardly at its lower end by a spring 54 whereby a bearing point 55 engages a suitable hub of friction disc 34 to urge the same against friction wheel 35 with a uniform pressure.

It will also be noted that by shifting friction wheel 35 to the upper side of the axis of wheel 36 that the direction of screw rotation will be reversed, thereby permitting the apparatus to be moved in both compression and tension tests.

Figure 3:
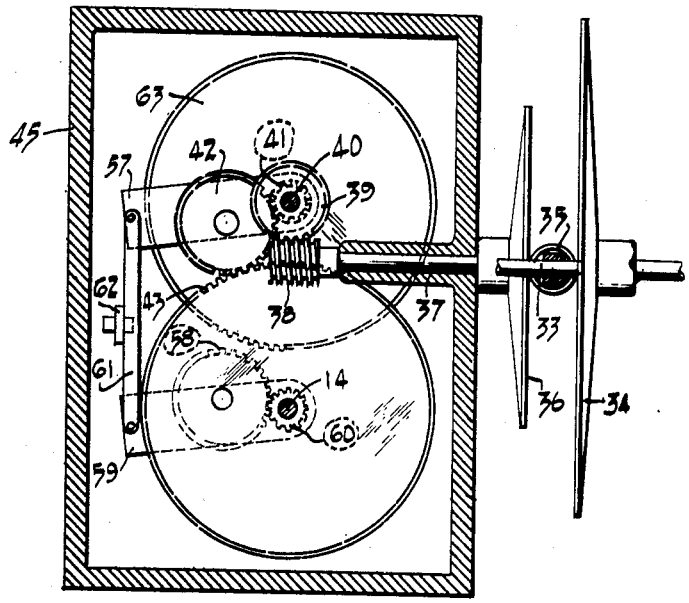
Fig. 3 is a horizontal section taken on the line 3—3 of Fig. 1.

To obtain a still further speed reduction, I have arranged the gears shown in Fig. 3 so as to throw certain of them out of engagement and others into engagement. For instance, gear 42 is journalled upon an arm 57 pivoted about shaft 40 while a gear 58 is journalled in an arm 59 pivoted about the axis of screw 14, this gear 58 meshing with a gear 60 secured to the screw. The arms 57 and 59 are pivotally connected by a cross link 61 operated from a point externally of the housing 45 by a pivotal link 62. Link 61, Fig. 3, may be shifted to bring gear 58 into mesh with a gear 63 and simultaneously throw gear 42 out of mesh with gear 43. Inasmuch as gear 63 is secured to the motor driven shaft 40 through gears 38 and 39, it is seen that a high rate of speed will be imparted through gears 63, 58 and 60 to screw shaft 14.

Figure 5:
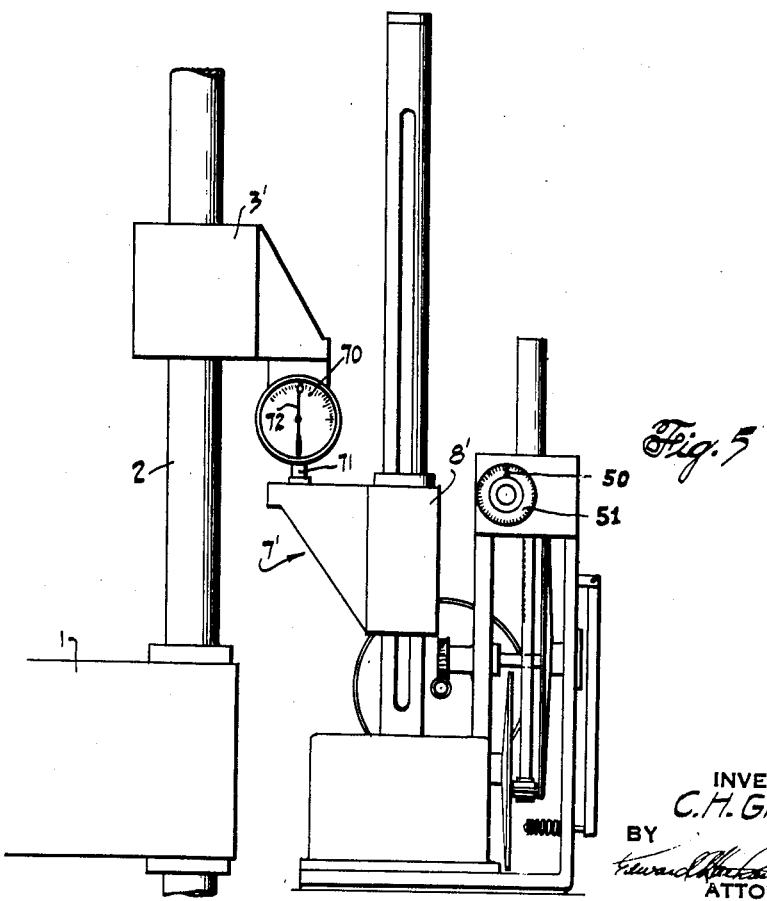
Fig. 5 is a modification employing a dial indicator in place of the light beamed type of indicator shown in Fig. 1, the remaining structural features otherwise being the same.

In the modification shown in Fig. 5, the carriage corresponding to 7 is simply in the nature of a bracket 7' secured to the sleeve 8'. All of the driving mechanism and remaining structure is identical in every respect to all of that heretofore described, and hence it need not be repeated. It will suffice to point out that the clamp 3' secured to the testing machine loading rod 2 carries a so-called Ames dial 70 with its gauge shaft 71 resting on top of bracket 7'. So long as the specimen is strained at a predetermined rate whereby bracket 3' moves synchronously with bracket 7', then no relative movement will occur therebetween and accordingly the pointer 72 will remain on its zero position. However, if the load on the specimen is not maintained at such a value as to insure a predetermined rate of strain of the specimen, then relative movement will occur between the brackets 3' and 7' and accordingly cause dial hand 72 to move to one side or the other of its zero position, thereby indicating that the predetermined rate of strain is not being maintained. Accordingly the operator can vary the load of the machine so as to restore the predetermined rate of strain which will be indicated when hand 72 returns to its zero position.

From the foregoing disclosure of the two modifications, it is seen that I have provided not only an extremely simple but also a very reliable and highly accurate and sensitive arrangement for indicating when the specimen is being strained under either compression or tension at some desired predetermined value, and it is also seen that my improved arrangement permits any desired rate of strain indication to be obtained with minimum effort.

It will of course be understood that various changes in details of construction and arrangement of parts may be made by those skilled in the art without departing from the spirit of the invention as set forth in the appended claims.

I claim:

1. Apparatus for determining the rate of movement of a power operated device comprising, in combination, an element movable in response to movement of said device, another element movable at a predetermined rate of speed, mechanism interposed between and normally continuously operatively connected to each of said elements so as to be instantly responsive to any relative movement therebetween, and indicating means normally disposed in a relatively immovable neutral position when no relative movement occurs between said elements thereby indicating that said responsive element is moving at said predetermined speed, said indicating means being operated by said interposed mechanism so as to be moved away from said neutral position upon occurrence of any relative movement between said elements thereby instantly indicating that said responsive element is moving at a rate above or below said predetermined rate.

2. The combination set forth in claim 1 further characterized in that said operative connection has means adapted to be freely disengaged from one of said elements in the event of abnormal movement therebetween.

3. Apparatus for determining the rate of movement of a power operated device comprising, in combination, an element movable rectilinearly in response to movement of said device, another element moved at a predetermined rate of speed, and mechanism interposed between, and operatively connected to, said elements so as to be responsive to relative movement therebetween including a dial indicator carried by one of said elements and engageable with the other thereof and said indicator having a pointer whereby its zero position indicates that the rectilinearly movable element is moving at the desired predetermined rate.

4. Apparatus for determining the rate of movement of a power operated device comprising, in combination, an element movable in response to movement of said device, another element moved at a predetermined rate of speed, and mechanism interposed between, and operatively connected to, said elements so as to be responsive to relative movement therebetween including indicating means provided with a mirror operated by said interposed mechanism, means for projecting a beam of light on to said mirror, and means whereby the reflected light from said mirror indicates whether the predetermined rate of movement is obtained.

5. Apparatus for determining the rate of movement of a power operated device comprising, in combination, an element movable in response to movement of said device, another element moved at a predetermined rate of speed, mechanism interposed between and operatively connected to each of said elements so as to be responsive to relative movement therebetween, means whereby said mechanism is adapted to indicate any relative movement between said elements, said predetermined rate of speed element being driven by means including a sleeve, a screw disposed within said sleeve and having operative threaded engagement therewith, and means for rotatably driving said screw at a predetermined rate of speed.

6. Apparatus for determining the rate of movement of a power operated device comprising, in combination, an element movable in response to movement of said device, another element moved at a predetermined rate of speed, mechanism interposed between and operatively connected to each of said elements so as to be responsive to relative movement therebetween, means whereby said mechanism is adapted to indicate any relative movement between said elements, said predetermined rate of speed element being driven by means including a sleeve, a screw disposed within said sleeve and having operative threaded engagement therewith, and a motor driven friction drive adapted to rotate said screw at a predetermined speed.

7. Apparatus for determining the rate of movement of a power operated device comprising, in combination, an element movable in response to movement of said device, another element moved at a predetermined rate of speed, mechanism interposed between and operatively connected to each of said elements so as to be responsive to relative movement therebetween, means whereby said mechanism is adapted to indicate any relative movement between said elements, said predetermined rate of speed element being driven by means including a sleeve, a screw disposed within said sleeve and having operative threaded engagement therewith, a motor driven friction drive adapted to rotate said screw at a predetermined rate, and means for adjusting said friction drive to obtain varying speed ratios or to reverse the rotation of the screw.

CHESTER H. GIBBONS.